Oct. 10, 1950     L. ERIKSEN ET AL     2,524,968
TIRE INFLATION INDICATOR
Filed May 1, 1947     2 Sheets-Sheet 1
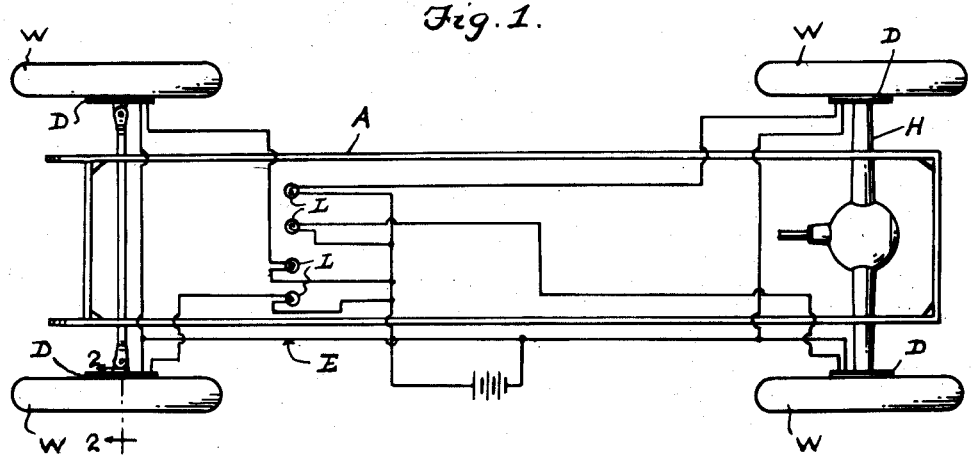
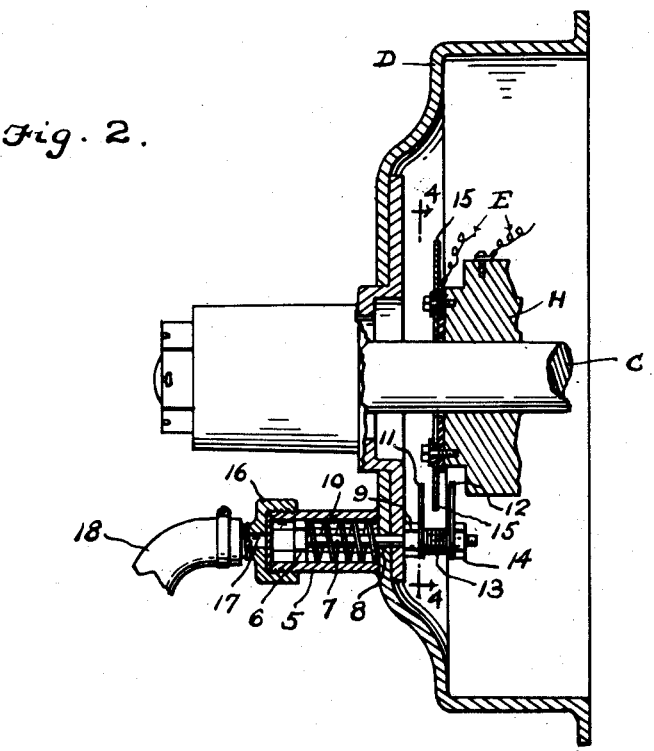
Inventors
Leonard Eriksen &
Chris Young
By L. B. James
Attorney

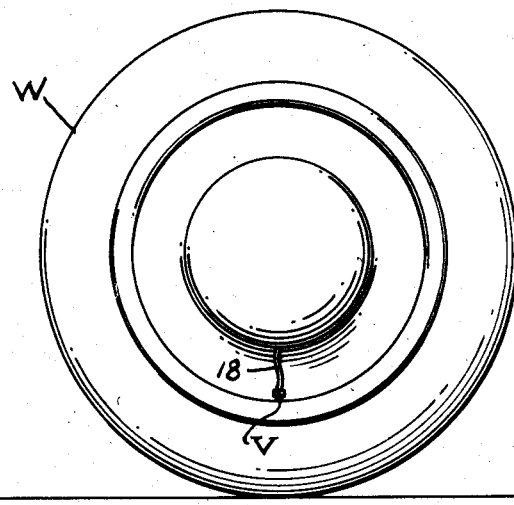
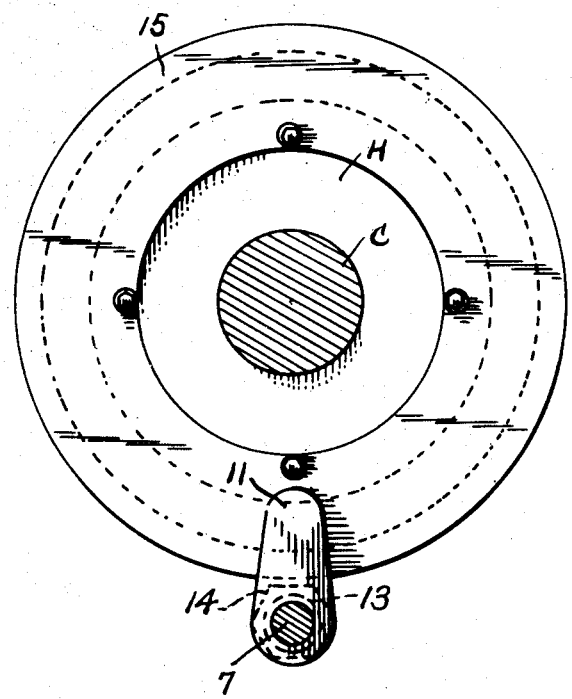
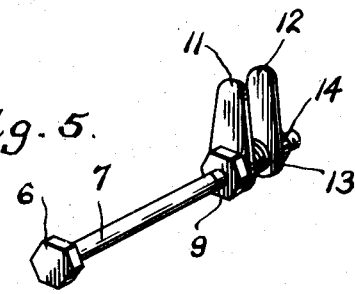
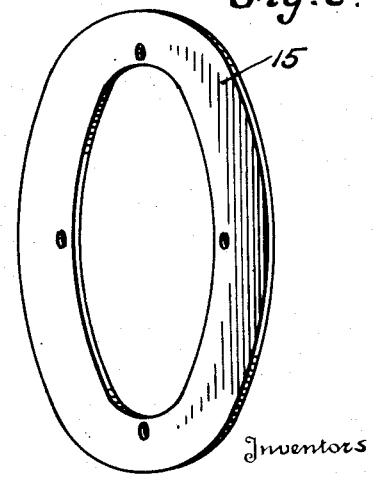

Patented Oct. 10, 1950

2,524,968

UNITED STATES PATENT OFFICE 2,524,968

TIRE INFLATION INDICATOR

Leonard Eriksen, Craig, and Chris Young, Tekamah, Nebr.

Application May 1, 1947, Serial No. 745,226

1 Claim. (Cl. 200—58)

This invention relates to the official class of signals and more particularly to pneumatic tire inflation signals.

The primary object of this invention resides in the provision of means adapted to disclose the air pressure in automobile tires to the operator of the vehicle at all times.

Another object of this invention resides in the provision of means adapted to indicate, before the operator of an automobile, any variation in pressure of either or all the tires thereon.

A further object of this invention resides in the particular assemblage of coacting elements mounted on each wheel of the vehicle.

A still further object of this invention resides in the particular manner of disposing the pressure heads on the brake drums of the wheels of pneumatic tire vehicles.

Aside from the foregoing objects, this invention resides in the particular association of the high and low pressure contacts of the pressure head and the stationary conductor ring.

One of the salient features of this invention resides in the provision of an assemblage of coacting signalling elements adapted to be readily secured to wheels of pneumatic tire vehicles whether they be in the stage of manufacture or in use.

With these and other objects in view, this invention resides in certain novel features of construction and arrangement of elements to be hereinafter more particularly set forth in the specification, illustrated in the accompanying drawings and pointed out in the appended claim and, although this disclosure depicts our present conception of the invention, the right is reserved to resort to such changes in construction and arrangement of elements as come within the spirit of the invention.

In the accompanying drawings forming a part of this application;

Fig. 1 is a diagrammatic view of the chassis of an automobile showing the inflation signalling means connected to the tire thereof.

Fig. 2 is an enlarged sectional view taken approximately on line 2—2 of Fig. 1.

Fig. 3 is a face view of one of the automobile wheels.

Fig. 4 is an enlarged sectional view taken approximately on line 4—4 of Fig. 2.

Fig. 5 is a detail perspective view of the pressure plunger and high and lower pressure contacts carried thereby.

Fig. 6 is a similar view of the conductor ring.

In the present illustration of this invention the letter A designates the chassis of an automobile which, among other well known elements, includes pneumatic tire wheels W mounted on axles C and carrying brake drums D, the rear axles, as usual, extend through the conventional type of housing herein indicated by the letter H.

Suitably secured to the outer face of each brake drum D outwardly therefrom is an air pressure head 5 in which is disposed a plunger 6 having a stem 7, slidably extending through a hole 8 in the brake drum and provided with a nut 9 normally held in spaced relation from the inner face of the brake drum under the influence of an expansion coil spring 10 on one side of the plunger and air pressure on the opposite side thereof.

Secured to the stem of each plunger within the brake drums of the wheels are spaced high and low pressure contacts 11 and 12, the former of which bears against the nut 9 while the latter of which bears against spacing washers 13 and is rigidly retained on the stem in opposed relation to the former mentioned contact by a nut 14 threadedly secured on the inner end of the stem. Through the instrumentality of the aforesaid washers and nuts, the high and low contacts on the inner ends of the plunger stems may be adjusted toward or away from one another by increasing or decreasing the number of washers therebetween to vary the distance of movement of the plunger in causing them to engage a conductor ring 15 secured to and insulated from each end of the axle housing of the rear wheels and axles of the front wheels with their outer portions disposed between the same.

Threadedly secured to each pressure head is a leak proof cap 16 having a bore 17 therethrough and connected to the open valve stem V of each tire of the automobile by a rubber hose 18 to form communication therebetween and the inflated tires so the pressure therein will cause the plungers to move accordingly, it being apparent that excessive pressure in the tires will cause the high pressure contact to engage the conductor ring while reduced pressure therein will cause the low pressure contact to engage the conductor ring and, through the instrumentality of electric circuits E connecting the pressure rings and high and low contacts with warning lights L or other suitable signals preferably disposed on the instrument board of the automobile, the operator of the vehicle will readily observe the variation of pressure in each tire of the vehicle.

With this invention fully set forth, it is manifest that the electric circuit of each wheel will remain open while normal tire pressure prevails and will be closed to operate the signals at any point of rotation of the wheels between predetermined variations of air pressure within the tires.

Having thus described our invention, what we claim and desire to protect by Letters Patent is:

In a tire pressure indicator, the combination with a pneumatic tired wheel opposed to a stationary support, a stationary conductor ring dielectrically secured to the stationary support in opposed relation to the inner side of the wheel, and forming one terminal of an electric circuit, an elongated pressure head secured to the outer side of the wheel and having a substantially rectangular bore axially aligned with a hole in the side of the wheel, a substantially rectangular plunger slidably disposed in the bore of the pressure head, an elongated cylindrical stem formed on the plunger and having its outer end threaded and extending through the hole in the side of the wheel, elongated upstanding contacts secured at their lower ends to the outer end portion of the stem and normally disposed equi-distance from opposite sides of the outer edge portions of the stationary contact ring and forming the terminal of the other side of the electric circuit connected to an electric indicator, a plurality of washers disposed on the stem between the elongated contacts, an expansion coil spring mounted on that portion of the stem within the bore of the head with one end thereof bearing against the head and its opposite end bearing against the plunger, a leak proof cap threadedly screwed on the outer end of the pressure head and having a bore therethrough registering with the bore in said pressure head, and an air hose connected at one end to the said cap and at its opposite end to an open valve of the pneumatic tire on said wheel.

LEONARD ERIKSEN.
CHRIS YOUNG.

REFERENCES CITED

The following references are of record in the file of this patent:

UNITED STATES PATENTS

| Number | Name | Date |
|---|---|---|
| 677,891 | Carichoff | July 9, 1901 |
| 1,202,870 | Meekins | Oct. 31, 1916 |
| 2,063,452 | McDonnell | Dec. 8, 1936 |
| 2,179,255 | Edmonston | Nov. 7, 1939 |
| 2,230,906 | Potts | Feb. 4, 1941 |
| 2,334,443 | Schubert | Nov. 16, 1943 |